(12) United States Patent
Stiesdal (10) Patent No.: US 8,552,613 B2
(45) Date of Patent: Oct. 8, 2013

(54) STATOR ARRANGEMENT, GENERATOR, WIND TURBINE, AND METHOD FOR POSITIONING A STATOR ARRANGEMENT

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 829 days.

(21) Appl. No.: 12/565,899

(22) Filed: Sep. 24, 2009

(65) Prior Publication Data

US 2010/0072854 A1 Mar. 25, 2010

(30) Foreign Application Priority Data

Sep. 25, 2008 (EP) .................................... 08016913

(51) Int. Cl.
*H02K 1/06* (2006.01)
*H02K 21/12* (2006.01)
*F03D 9/00* (2006.01)
*F04D 29/08* (2006.01)

(52) U.S. Cl.
USPC .................. 310/216.113; 310/156.12; 290/55; 415/170.1

(58) Field of Classification Search
USPC .................. 310/216.113, 156.12, 254.1, 420; 290/55; 415/170.1, 216.1
See application file for complete search history.

(56) References Cited

U.S. PATENT DOCUMENTS

| 7,011,497 B2 * | 3/2006 | Schmidt ...................... 415/216.1 |
| 2008/0199309 A1 * | 8/2008 | Bagepalli et al. ........... 415/170.1 |
| 2009/0015020 A1 * | 1/2009 | Stiesdal ........................... 290/55 |

FOREIGN PATENT DOCUMENTS

| CN | 2130005 Y | 4/1993 |
| CN | 1945930 A | 4/2007 |
| CN | 101338733 A | 1/2009 |
| DE | 10239366 A1 | 3/2004 |
| DE | 102004028746 A1 * | 12/2005 |
| WO | 0060719 A | 10/2000 |
| WO | WO 2007111425 A1 | 10/2007 |

OTHER PUBLICATIONS

Machine Translation DE102004028746 (2005).*

* cited by examiner

*Primary Examiner* — Tran Nguyen
*Assistant Examiner* — Jose Gonzalez Quinones (57) ABSTRACT

A stator arrangement of an electric machine, particularly a generator in a wind turbine is provided. The stator arrangement is radially surrounded by a rotatably mounted rotor arrangement. During normal operation the stator arrangement is non-rotatably connected to a stationary part of the generator. The stator arrangement may be released from the non-rotatable connection to the stationary part of the generator so as to be revolved relative to the stationary part of the generator. A method for positioning such a stator arrangement is also provided.

9 Claims, 6 Drawing Sheets

STATOR ARRANGEMENT, GENERATOR, WIND TURBINE, AND METHOD FOR POSITIONING A STATOR ARRANGEMENT

CROSS REFERENCE TO RELATED APPLICATIONS

This application claims priority of European Patent Office application No. 08016913.9 EP filed Sep. 25, 2008, which is incorporated by reference herein in its entirety.

FIELD OF INVENTION

The invention relates to a stator arrangement of an electric machine, especially of a generator for a wind turbine. The invention concerns also a generator, e.g. a direct drive generator for a wind turbine comprising such a stator arrangement as well as a wind turbine comprising such a generator. Furthermore the invention relates to a method for positioning a stator arrangement.

BACKGROUND OF INVENTION

Each wind turbine comprises a generator, e.g. a large direct drive generator having a generator stator and a generator rotor for the production of electrical energy.

Wind turbines are erected onshore as well as offshore. In particular, when a wind turbine is erected offshore, the wind turbine as a whole, but also the generator is exposed to rough environmental conditions, like humidity, salty particles, etc. If not sufficiently protected in particular the stator components of a wind turbine generator are exposed to damages due to corrosion and to an increased risk of electrical faults under such offshore environmental conditions. Besides, other reasons might be present so that a fault might occur, offshore or onshore.

SUMMARY OF INVENTION

Obviously a failure of the generator should be avoided, but in case of a failure a quick and easy maintenance and repair of the failure should be made possible.

It is advantageous when the generator stator comprises a series of independent stator segments. A segmented stator has the benefit that in case of a fault the respective affected stator segment can be replaced at a fraction of the costs and effort required for the replacement of the complete stator. However, during the transportation and the handling of the individual stator segments, e.g. in the course of the erection of the wind turbine, the stator segments may be exposed to humid and salty ambient conditions which may cause a damage of single stator segments.

It has to be acknowledged that a generator may be comprised of rotor elements, e.g. permanent magnets, and stator elements, e.g. a laminate stack with windings. Such generators, in particular generators of a wind turbine, may be of large size, like direct drive or directly driven generators with possibly a diameter of several meters. In such a generator, in the case of a failure of a stator segment, it might be difficult to exchange a stator segment due to the size and weight, especially if not the whole generator should be replaced as one. For the repair of a generator or the exchange of generator parts an access opening might be available but still it might be difficult to reach or to exchange the defect part via that opening.

Especially a difficulty arises in configurations with direct drive generators where the generator is placed between the hub and the tower in order to yield a compact machine construction. Such a construction can be seen in FIG. 2. Here it will usually be necessary to dismantle the whole hub to eventually dismantle the stator of the generator.

It is therefore an object of the present invention to provide a stator arrangement, a generator, a wind turbine as well as a method as initially mentioned in such a way that a replacement of stator parts can performed in a simpler way.

The object of the invention is inventively achieved by a stator arrangement, by a generator, by a wind turbine, and a method.

Advantageous embodiments can be found in the dependent claims.

The inventive stator arrangement of an electric machine is directed to an inner stator and an outer rotor. The electric machine may be especially a generator for a wind turbine. Specifically the invention concerns the stator arrangement of an electric machine, wherein the stator arrangement is radially surrounded by a rotatably mounted rotor arrangement. During normal operation—the intended use of the generator during operator of the electric machine—the stator arrangement is non-rotatably connected to a stationary part of the generator. The stator arrangement is releasable from the non-rotatable connection to the stationary part of the generator so as to be revolved relative to the stationary part of the generator.

Thus, the stator arrangement is interlocked with a stationary part of the electric machine in such a way that the stator arrangement remains fixed to the stationary part during normal conditions, but where the stator arrangement can be made to rotate around the stationary part in case of replacement of parts of the stator, e.g. during maintenance or during non-normal operation of the generator during which the generator is not under load.

Particularly the stator arrangement may be interlocked with a rotating part of the electric machine causing the stator arrangement to revolve uniformly with the rotating part if the rotating part rotates, particularly the stator arrangement and the rotor arrangement having the same angular speed.

The stator arrangement may be set up around a concentric shaft and the rotor arrangement may be supported on the shaft.

The stator arrangement according to the invention is particularly advantageous if maintenance or repair of a stator segment is necessary and an access opening in the casing of the electric machine to the stator arrangement is available but from the access opening only a fraction of stator segments can be reached. The invention allows to reposition the stator in a maintenance step via a revolving turn of the complete stator arrangement around its axis of rotation so that the stator segment that needs to be replaced will be reachable by service personnel or by service equipment via that access opening.

Possibly removable fixation like bolts may be used to lock the stator in an unrevolvable position during normal operation of the electric machine. This fixation, namely the bolts, may then be removed to be able to revolve the stator arrangement around its axis of rotational symmetry.

The invention is especially advantageous for very large electric machines like generators for power generation. Due to the heaviness of the generators a single stator segment might be heavy and difficult to handle when replaced. The invention simplifies the exchange of a stator segment. This is especially true if the generator is mounted in a wind turbine or another compact arrangement with little space to operate.

The interlocking of the stator arrangement with a rotating part of the electric machine may be performed in different ways. In a first preferred embodiment the interlocking of the stator arrangement with the rotating part can be performed by mechanical locking of the stator arrangement with the rotating part. Before this interlocking can take place, a fixation of the stator arrangement that is used to keep the stator arrangement unrevolvable during normal operation of the electric machine, may be removed. Additionally the revolving of the stator arrangement may be guided that way that only rotating movements will be allowed by a flange used as a guiding rail for the stator arrangement. Axial movements parallel to the axis of symmetry of the rotor or stator will be prohibited by the flange. Possibly the stator arrangement will be comprised of end plates attached to the axial ends of the cylindrical stator arrangement, the end plates being formed to exactly match the flanges.

In a second preferred embodiment the interlocking of the stator arrangement with the rotating part can be performed by applying direct current to coils intended for electromagnetic induction of the stator arrangement and/or the rotor arrangement so that the stator arrangement is locked with the rotating part—especially the rotor of the electric machine—via electro-magnetic force. In a lot of cases the rotor arrangement comprises permanent magnets and the stator arrangement comprises coils around a metal body even though an opposite configuration would be feasible, so that applying current to the coils will lead to an electro-magnetic force between the adjacent parts of the rotor and the stator.

As in the first embodiment, before this interlocking can take place, a fixation of the stator arrangement that is used to keep the stator arrangement unrevolvable during normal operation of the electric machine, may be removed. Additionally again it is assumed, that two end plates may be used for fixation—e.g. via bolts—of the stator segments and that the rotation of the end plates during maintenance may be guided by flanges. Then the stator arrangement including its stator segments and its joined end plates are revolvable as a joined unit and may revolve altogether, attracted by the rotating rotor via the electro-magnetic force, around its axis of symmetry. Even though the stator and the rotor are attracting each other due to the electro-magnetic force, the end plates provide a support that no radial movement of the stator or the stator segments are possible.

In contrast to that in a third embodiment such a radial movement of the stator or the stator segments is used as an alternative for the previously mentioned solution. During normal operation the stator arrangement may be comprised of stator segments joined with two end plates, e.g. via bolts. For maintenance, the stator arrangement may be disassembled by dismantling the end plates and the stator segments, e.g. by loosening the bolts. Before, direct current may be applied to the coils of the stator so that electro-magnetic force is exerted between the rotor and the stator. Also before the disassembly, some kind of protective material like plates of nylon or rubber may be inserted into the air gap between the rotor and the stator so that the rotor and stator do not damage themselves when attracted to each other. By applying the direct current, each of the stator segments of the stator arrangement may be locked separately to an opposing rotor section due to the electro-magnetic force. Then the rotor can be rotated causing also the stator segments to rotate, because they revolve jointly with the opposing rotor section. The end plates itself may not rotate at all. And once in the right position the stator segments may be rebolted again to the end plates. Afterwards the current may be shut down.

All three mentioned embodiments above allow repositioning the stator for maintenance or repair by revolving the stator, so that a specific to be repaired stator segment may be adjusted at a specific position so that an easy access to that stator segment is possible for service personnel.

The object of the present invention is also inventively achieved by a generator comprising a stator arrangement as described before and a wind turbine comprising a generator with a stator arrangement as described before. Besides, the object of the present invention is also inventively achieved by a method for positioning a stator arrangement.

BRIEF DESCRIPTION OF THE DRAWINGS

The invention will in the following be explained in more detail with reference to the schematic drawings, wherein.

DETAILED DESCRIPTION OF INVENTION

Figure 1:
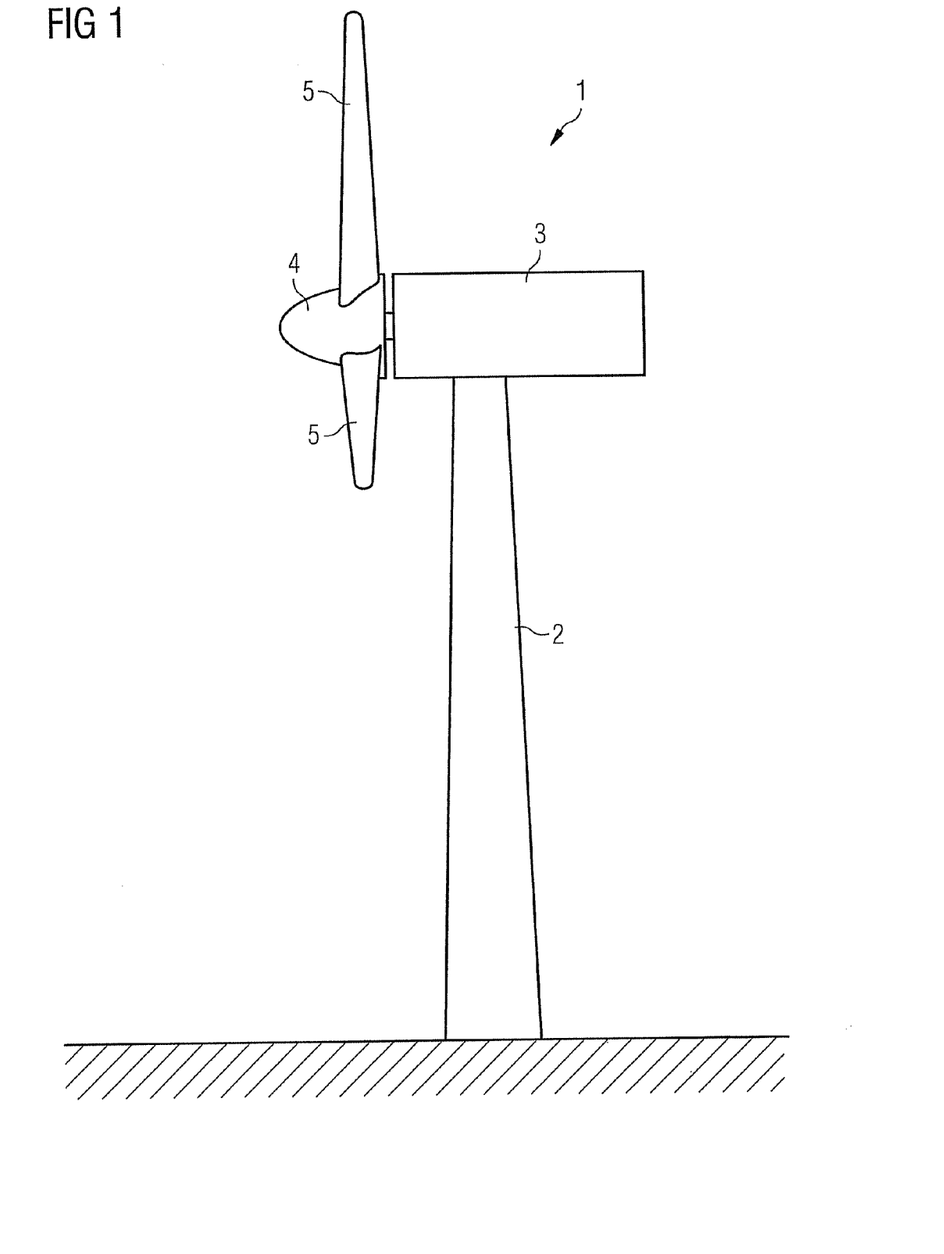
FIG. 1 shows a wind turbine.
Figure 2:
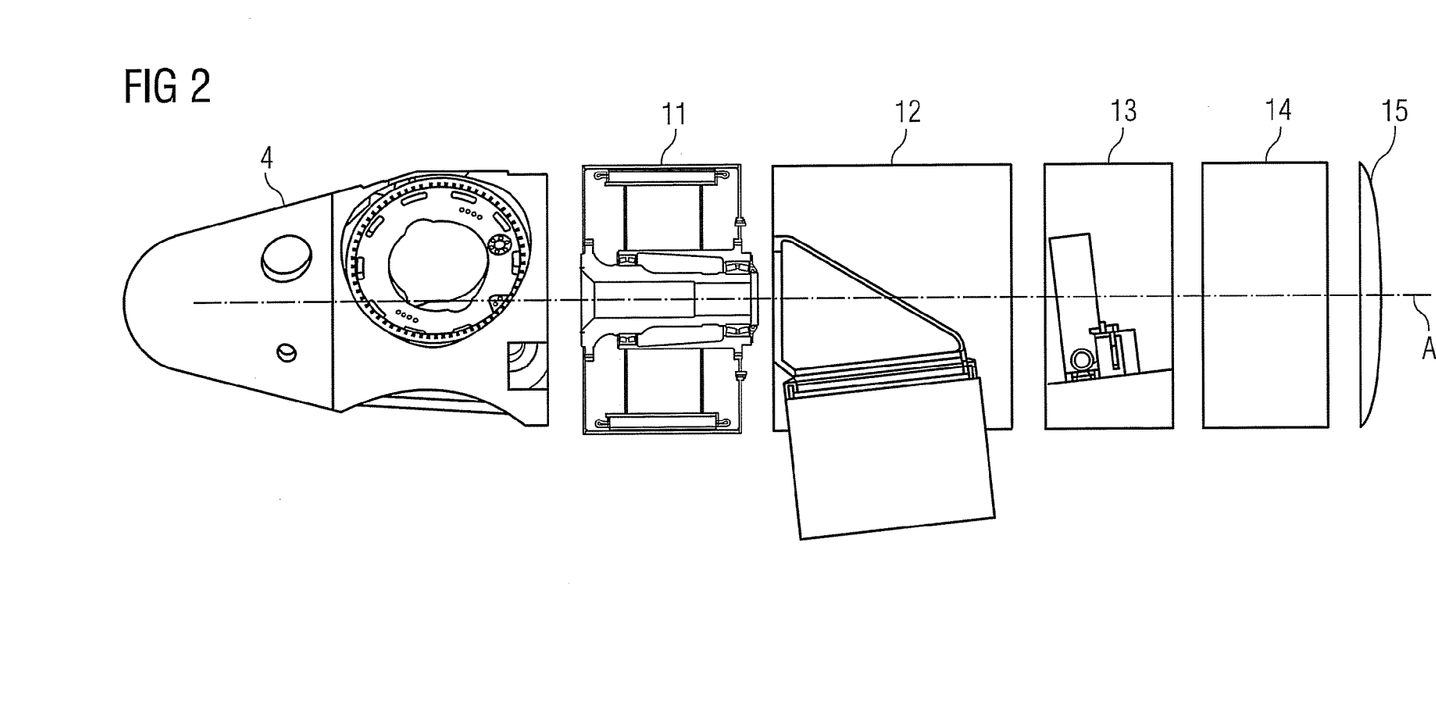
FIG. 2 shows modules of a wind turbine.

FIG. 1 shows a wind turbine 1 comprising a tower 2, a nacelle 3 and a hub 4 with rotor blades 5. In the nacelle 3 several further components of the wind turbine 1 are arranged like a generator 11 as it is schematically shown in FIG. 2. The generator 11 is in a not shown manner connected to the hub 4 for the production of electrical energy and has a substantially horizontally aligned centre axis A.

FIG. 2 shows some basic components of a wind turbine 1. The components are shown with a slight gap between each other, even though when assembled, these gaps are closed. Again, a hub 4 is shown to which the rotor blades—not shown—will be attached. Further components, each adjacent to each other, are the generator 11, the load/bearing section 12, which has a connection to the not shown tower 2. Next, further components are a control unit 13, cooling equipment 14, and an end cap 15.

Figure 3:
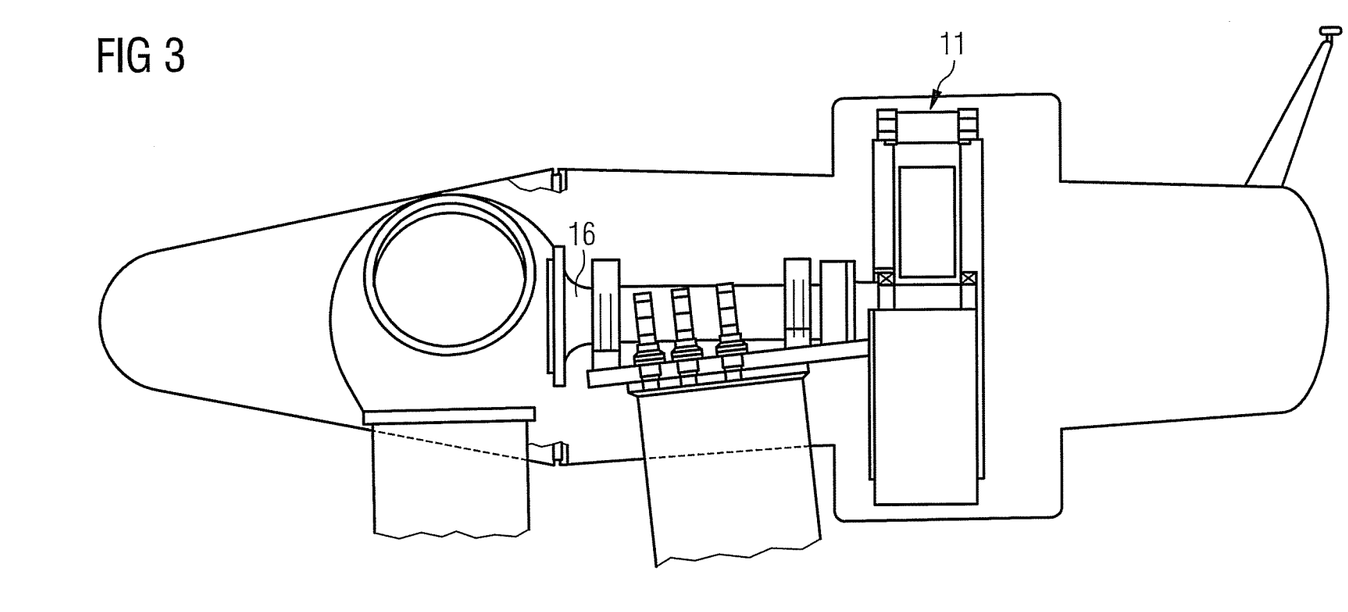
FIG. 3 shows a generator of a wind turbine within its housing.

Whereas in FIG. 2 the generator 11 is set up in front of the tower between the rotor blades and the tower, in FIG. 3, in which an alternative wind turbine is shown inside its housing, the generator 11 is arranged behind the tower. Specifically you can see in FIG. 3 that the generator 11 attached to a shaft 16. In such a design and with an inner stator of the generator 11 that is radially surrounded by a rotor of the generator 11, maintenance of stator components of the generator 11 may be difficult and may only be possible via axial manholes (not shown in FIG. 3).

Figure 4A:
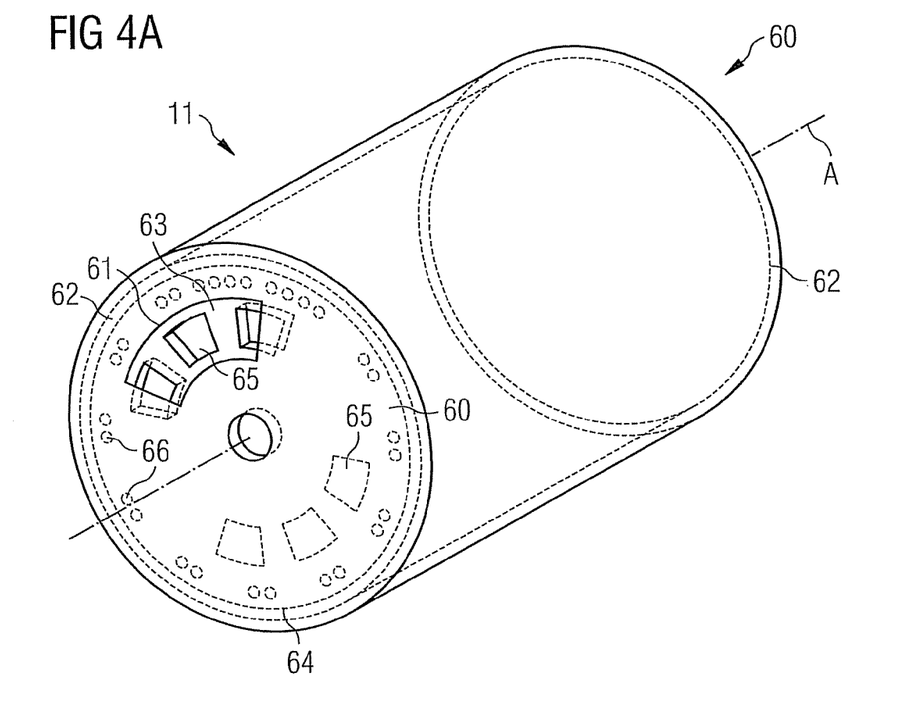
FIG. 4 shows a drawing of a generator.
Figure 4B:
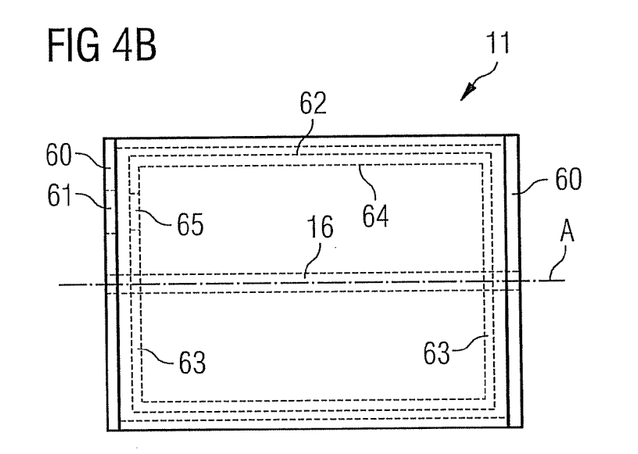

FIG. 4 shows a drawing of a generator 11—FIG. 4A as three-dimensional drawing and FIG. 4B as cross sectional drawing. Mainly only the cylindrical housing of the generator 11 can be seen, comprising a generator end plate 60. The axis of symmetry of the generator 11 is indicated by the line A. The generator end plate 60 comprises an exemplary manhole 61 which allows access to inner parts of the generator 11. Indicated by dashed or dotted lines, are also inner parts of the generator 11, like the outer rotor 62 and the stator 64, the stator 64 comprising stator segments (not shown) and a stator end plate 63, which optionally may also have some cut-outs 65 for maintenance or to reduce weight.

The stator end plate 63 may be permanently fixated to the stator segments, but may be detachable, e.g. by using bolts 66 that may be removed for maintenance. In FIG. 4B also the shaft 16 of the wind turbine is indicated around the axis of symmetry A.

The manhole 61 as a cut-out in the generator end plate 60 ensures the possibility of going through the generator end plate 60 for maintenance. Even though the manhole 61 is limited to a section of the generator end plate 60, the inventive approach to adjust a defect stator segment right that way that it can be reached via the manhole 61 allows an easy maintenance, repair, or replacement of defect stator parts. Also several manholes may be possible.

Basis for all embodiments that will be discussed in the following is that a generator 11 comprises an inner stator that is radially surrounded by an outer rotor. "Inner" and "outer" relate to a position in respect of a rotation axis A of the cylindrical generator 11. "Inner" means closer to the axis A, "outer" means further away from the axis A.

In some drawings the outer rotor will not be shown but one has to be aware that the outer rotor will be present in the generator 11 and it is an object of the invention that the rotor will not be removed for maintenance.

Besides, it will be assumed that one of the stator arrangement and rotor arrangement providing magnets for magnetic forces and the other one of the stator arrangement and rotor arrangement comprising coils. Specifically in the following embodiments it will be assumed that the inner stator will be comprised of coils embedded in laminated sheets of metal. The magnets will be comprised in the circumferential outer rotor. Furthermore it is assumed that a narrow air gap will be present between the outer circumferential radial surface of the stator and the inner radial surface of the rotor.

Figure 5:
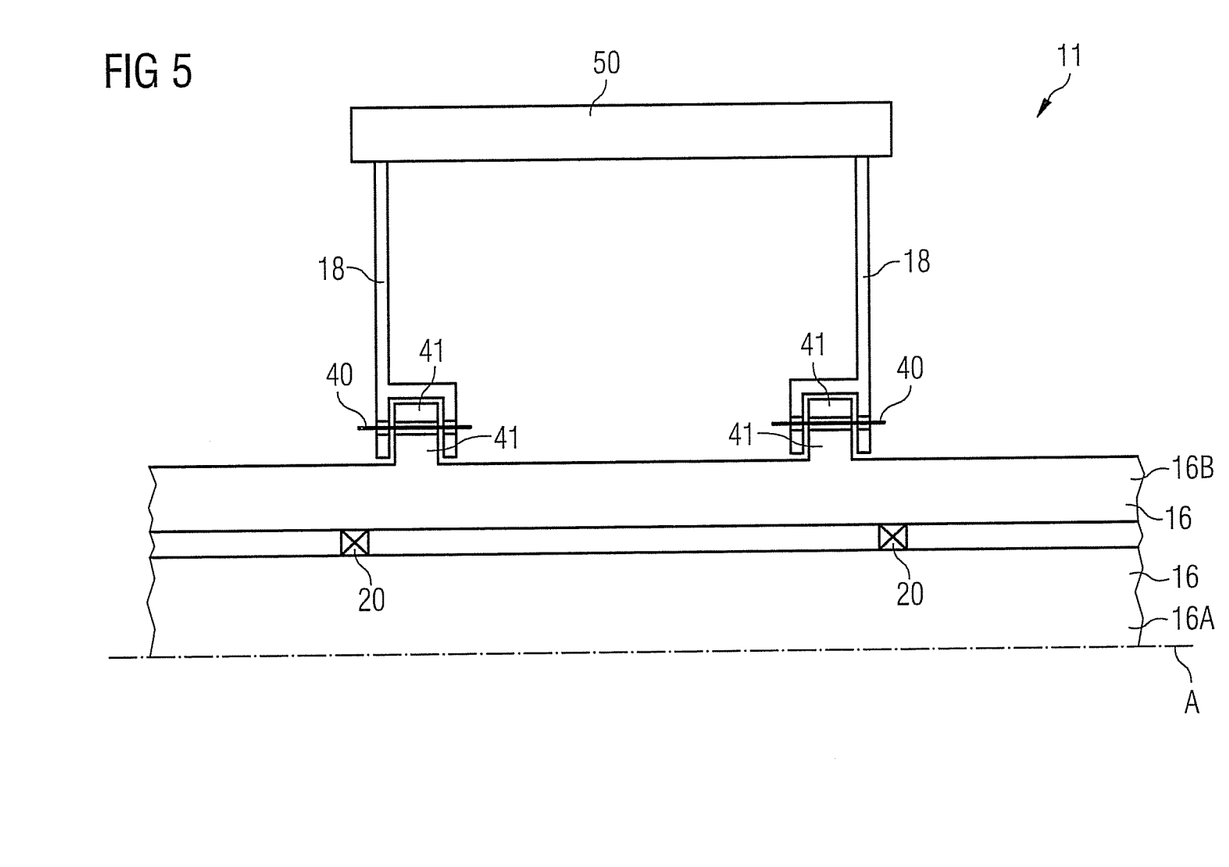
FIG. 5 shows a sectional drawing of a generator stator mechanically fixable to the shaft of the generator.

In FIG. 5 a generator 11 is shown as a sectional drawing, showing a section through the central axis A of the generator 11. The drawing is very schematic and simplified to clearly show the inventive concept. In the figure centrally located around the axis A of rotation, is a revolving part 16A of a shaft 16. This revolving part 16A of the shaft 16 is connected to the hub—not shown in FIG. 5; see hub 4 in FIG. 2.—and to the rotor, which is not shown, which all revolve around the axis A.

Around the revolving part 16A of the shaft 16 there will be—possibly coupled via bearings 20—a fixed, non-revolving part 16B of the shaft 16.

During normal operation of the generator 11, stator segments 50—in the cross section only one stator segment is indicated—are interconnected with two end plates 18, which again are interconnected with the non-revolving part 16B of the shaft 16. The end plates 18 correspond to the stator end plates 63 according to FIG. 4. The interconnection between the stator segment 50 and the end plates 18 are schematically shown in the figure simply by a contact surface between the outer radial surface of the end plates 18 and an inner radial surface of the stator segment 50. Any kind of separable or inseparable link is possible, because for the process explained with FIG. 5, the stator segments 50 will continuously be kept assembled with the end plates 18. The interconnection between the end plates 18 and the non-revolving part 16B of the shaft 16 will be arranged as separable link, e.g. via bolts 40. In the cross section of FIG. 5 only two bolts 40 are shown, but a number of bolts may be present throughout the circumference of the non-revolving part 16B of the shaft 16.

In FIG. 5 the non-revolving part 16B of the shaft 16 will have two circumferential flanges 41—in FIG. 5 shown with a gap indicating a tubular recess for inserting the bolt 40—allowing the end plates 18 to connect to the flanges 41 via the bolts 40. For this each of the end plates 18 may be formed correspondingly to one of the flanges 41, quite perfectly fitting to the flanges 41 by having the corresponding cross sectional form. The radial inner part of the end plates 18, next to the flanges 41 and surrounding them, may have holes so that the bolts 40 can be inserted through the holes of the end plates 18 and through the tubular recess of the flanges 41 to physically connect these two parts. During normal operation of the generator 11, the bolts 40 will be inserted and the stator will not be revolving. This is the intended work mode of the generator.

The flanges 41 may be rotational symmetric without any potrusions at the outer radial surface of the flanges 41, so that the stator 11 including the stator segments 50 the end plates 18 may be guided by the flanges 41, so that, if unbolted and not locked to the flanges 41, essentially no axial movement of the stator 11 is possible only allowing revolution of the stator 11 around the axis A.

In the figure the flanges 41 are in form of an annulus with essentially rectangular cross section. In this case the end plates 18 will be formed at their radially inner end as a U-shaped circumferential pit. The cross-sectional U-shape should essentially perfectly match the cross-sectional form of the flanges 41, so that the U-shape will also be comprised of essentially right-angled sides.

Not shown in FIG. 5, there is a possibility to temporarily physically connect the stator to a revolving part of the generator, e.g. the revolving part 16A of the shaft 16 or a part of the outer rotor.

In case of a failure, the need to repair or the need to replace a stator segment 50, the generator 11 might stop revolving automatically or by manual intervention. Service personnel may identify a defect in a stator segment 50 and may realize that a repair or exchange of that stator segment 50 may not be possible, because the manhole 61 in the generator end plate 60 and the to be exchanged stator segment 50 may not be aligned properly so that an exchange via the manhole 61 is not directly possible. Now the inventive idea comes into place, so that the stator will be revolved by such an angle so that the to be exchanged stator segment 50 will be aligned in relation to the manhole 61, so that the respective stator segment can be accesses through the manhole 61.

To revolve the stator, the bolts 40 connecting the end plates 18 with the non-revolving part 16B of the shaft 16 will be removed overall the circumference. The stator with all its stator segments 50 now may be "loose" in respect of revolving movements guided by the flanges 41. The flanges 41 will also prohibit axial movements of the stator segments 50. The next step would be to interlock the stator segments 50 with a rotating part of the generator 11 causing the stator arrangement with its stator segments 50 to revolve if the rotating part rotates. This can take place by mechanically locking the stator segments 50 with the revolving part 16A of the shaft 16 or with the rotor.

Revolving this interlocked rotor-stator entity may take place by applying a revolving force to the revolving part 16A of the shaft 16. One possibility would be to have a motor that could be temporarily connected to the generator 11, specifically to the revolving part 16A of the shaft 16 or to the rotor. Without an additional motor, the interlocked rotor-stator entity could be driven by the wind blades 5 of the wind turbine 1. The wind blades 5 may be in idling position to guarantee a very slow rotation. To guarantee that the revolving will be very slow, maybe additional brakes may be applied while revolving or the wind blades 5 may be tilted that way that only a slight driving force will act upon the wind blades 5 and consequently to the hub 4 and to the revolving part 16A of the shaft 16. Possibly also a gear may be present to reduce the revolving speed so that a very precise rotation may be possible of the interlocked rotor-stator entity without causing further negative effects, e.g. damage, on the rotor or the stator.

Once properly adjusted, the rotation of the revolving part 16A of the shaft 16 will be discontinued. A precise alignment of holes in the stator end plates 18 with its holes for the bolts 40 and the flanges 41 may be necessary so that rebolting them may be possible. Then, the bolts 40 may be inserted again to fix the stator arrangement to the flanges 40 and consequently to the non-revolving part 16B of the shaft 16. Then the temporary fixation of the stator segments 50 to the rotor or the rotating part 16A of the shaft will be removed again.

Being in this position, finally the defect stator segment 50 may be removed or be repaired easily via the manhole 61. For this the rotor may be locked manually by pin or some other means so that no moving parts may harm the service personnel.

Proceeding to FIG. 6 two alternatives will be discussed to allow a rotation of the stator arrangement and to provide interlocking of the stator arrangement to a revolving part of the generator. In these alternatives, the interlocking is performed by locking the stator segments via electro-magnetic force to the rotor, specifically its permanent magnets.

It will be utilised that coils and magnets for generation of three-phase current will be present in the generator. But instead of the induction of current into the coils due to the rotation of the rotor—which is the normal operation of a generator—, actively direct current is applied to all or some of the coils in that way, that the stator coils will be attracted by the opposing permanent magnets of the rotor. In view of the fact that the air gap between the rotor and the stator may be small, the magnets may be "strong" and a lot of coils will be present, it may be possible to attract the stator with such a force, that, if the stator would not be bolted to the non-revolving part 16B of the shaft 16, the stator would revolve with the same speed as the rotor. Thus the rotor and the stator would be interlocked both as one united revolving unit.

Figure 6:
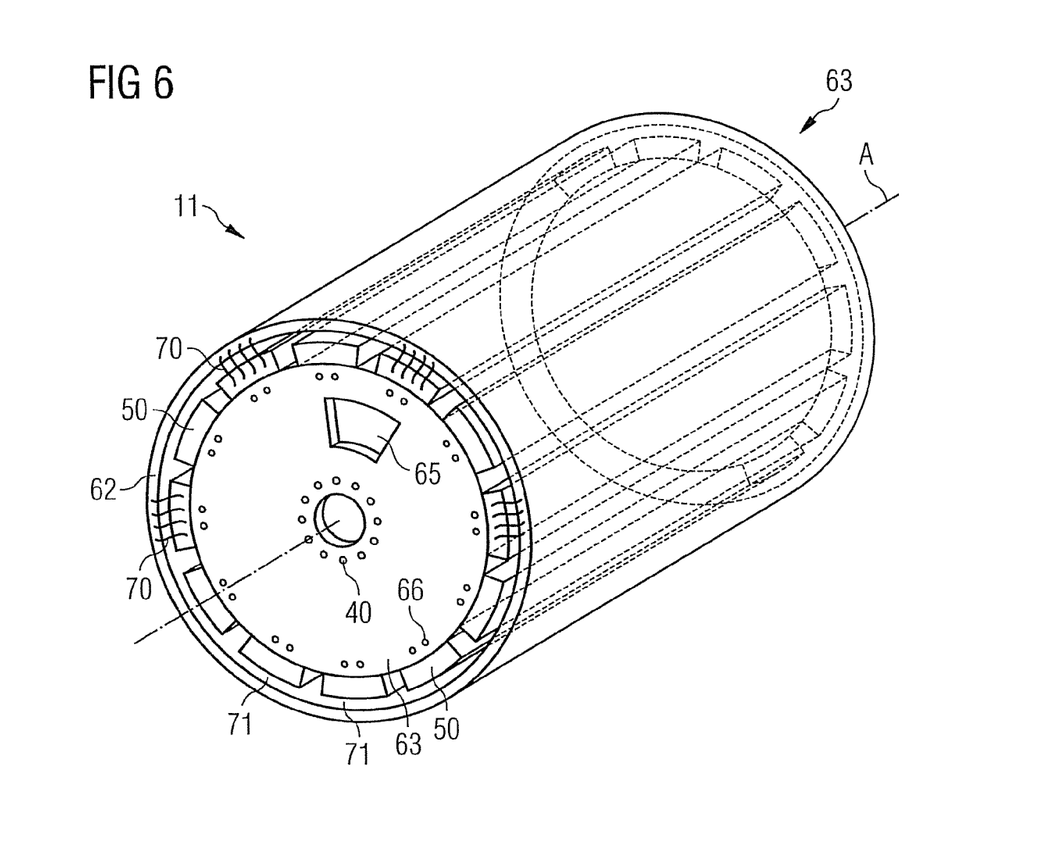
FIG. 6 shows a three-dimensional drawing of a generator with a stator electro-magnetically fixable to a rotor of the generator.

This effect will be utilised by the present embodiment of the invention, so that like in the previous embodiment the stator arrangement will be loosened from the non-revolving part 16B of the shaft 16 but the fixation to the rotating part 16A will not be performed by mechanically locking the stator to the rotating part but only by applying direct current to the coils, so that the stator segments 50 are attracted via electro-magnetic force—indicated in FIG. 6 by a plurality of oscillating lines with reference sign 70—to the rotor 62 and an interlocking with the rotor 62 takes place.

Then, as before, the rotor 62 may be rotated by applying a revolving force to the revolving part 16A of the shaft 16. This will not be discussed further because this does not differ from the previously discussed embodiment. Finally, once in the proper position, the rotation may be stopped, the stator arrangement may be mechanically locked again to the non-revolving part 16B of the shaft 16, and the direct current will be discontinued, thus ending the electro-magnetic force 70. Then the maintenance work can be executed.

For this embodiment it needs to be acknowledged, that the stator arrangement including all its stator segments 50 and its stator end plates 63 physically stays as one entity and will not be disassembled for revolving the stator. The same is true for the first embodiment according to FIG. 5.

A further embodiment will also be explained by means of FIG. 6. In this embodiment the stator will be disassembled before revolving the disassembled stator segments 50. Even though the stator will be disassembled all stator segments 50 will stay in their relative positions which will again be forced by applying direct current and by utilising electro-magnetic force 70. This will be explained in the following.

Starting situation may be again that the stator segments 50 are attached to end plates 63, the end plates 63 attached to the non-revolving part 16B of the shaft 16 via bolts 40. Now, some kind of protective sheet will be inserted into the air gap 71 between rotor 62 and stator segments 50. The end plates 63 may stay attached with the non-revolving part 16B of the shaft 16 and direct current will be applied to the stator coils of the stator segments 50. Now, once the stator segments 50 will be attracted to the rotor 62, fixation of the stator segments 50 to the stator end plates 63 may be manually removed, e.g. by removing the bolts 66. Now every stator segment 50 may itself be attracted to the rotor 62. Once the shaft and/or the rotor 62 get revolved driven by the wind blades 5 or by an extra motor, the rotor 62 rotates together with the detached plurality of stator segments 50 as one unity, but without the stator end plates 63 of the stator arrangement. Finally, when a proper position is reached, the single stator segments 50 will be reattached to the end plates 63 by inserting the bolts 66 again. When finished, the current may be switched off to discontinue the electro-magnetic force 70.

The last embodiment differs from the previous ones, that a cut-out 65 within the stator end plates 63 may also stay in its position while the stator segments 50 get revolved. This may be advantageous in specific situations to reach a defect stator part through that cut-out 65.

All embodiments have the advantage that an easy access to defect inner parts of a generator will be allowed without dismantling the whole generator or the surrounding outer rotor.

Besides, the embodiments have the advantage that during adjustment of position the air gap does not vary or is protected by inserted by soft material. Therefore further damage of stator segments can be avoided.

The invention claimed is:

1. A stator arrangement of an electric machine set up in a cylindrical form, wherein
   the stator arrangement is radially surrounded by a rotatably mounted rotor arrangement,
   during normal operation the stator arrangement is non-rotatably connected to a stationary part of the electric machine,
   the stator arrangement is releasable from the non-rotatable connection to the stationary part of the generator so as to be revolved relative to the stationary part of the generator,
   the stator arrangement is interlocked with a rotating part of the electric machine causing the stator arrangement to revolve when the rotating part rotates, and
   the interlocking of the stator arrangement with the rotating part is performed by applying direct current to coils intended for electro-magnetic induction of one of the stator arrangement and rotor arrangements so that the stator arrangement is locked with the rotating part via electro-magnetic force.

2. The stator arrangement according to claim 1, wherein the electric machine is a generator.

3. The stator arrangement according to claim 1, wherein the electric machine is a generator for a wind turbine.

4. The stator arrangement according to claim 1, comprises a plurality of stator segments forming substantially the stator of the electric machine in the cylindrical form.

5. The stator arrangement according to claim 4, comprises two end plates for interlocking of the stator segments.

6. The stator arrangement according to claim 5, wherein the stator segments and the end plates are revolvable as a joined unit.

7. A generator, comprising:
   a stator arrangement of an electric machine set up in a cylindrical form according to claim 1.

8. A method for positioning a stator arrangement of an electric machine set up in a cylindrical form, the stator arrangement being radially surrounded by a rotatably mounted rotor arrangement, comprising:
   interlocking the stator arrangement with a stationary part of the electric machine so that during normal conditions the stator arrangement is fixed to the stationary part such that the stator arrangement is non-rotatably connected to the stationary part;
   releasing the interlocking and interlocking the stator arrangement with a revolving part so that during non-normal conditions so that the stator arrangement is rotatable around the stationary part, and
   wherein the interlocking of the stator arrangement with the rotating part comprises applying direct current to coils intended for electro-magnetic induction of one of the stator arrangement and rotor arrangements so that the stator arrangement is locked with the rotating part via electro-magnetic force.

9. The method according to claim 8, further comprising during the maintenance condition:
   rotating the stator arrangement so that a part requirement maintenance is accessible via a man hole.

* * * * *